US009916460B2

(12) United States Patent
Barbas et al.

(10) Patent No.: US 9,916,460 B2
(45) Date of Patent: *Mar. 13, 2018

(54) SECURE DATABASE BACKUP AND RECOVERY

(71) Applicant: International Business Machines Corporation, Armonk, NY (US)

(72) Inventors: Pedro M. Barbas, Dunboyne (IE); Joseph Duffy, Dublin (IE); Ken Maycock, Dublin (IE); David M. Tilson, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,486

(22) Filed: Oct. 31, 2016

(65) Prior Publication Data

US 2017/0046521 A1    Feb. 16, 2017

Related U.S. Application Data

(63) Continuation of application No. 14/883,905, filed on Oct. 15, 2015.

(30) Foreign Application Priority Data

Nov. 6, 2014    (GB) .................................. 1419768.5

(51) Int. Cl.
*H04L 29/06* (2006.01)
*G06F 21/60* (2013.01)
(Continued)

(52) U.S. Cl.
CPC ........ *G06F 21/602* (2013.01); *G06F 11/1448* (2013.01); *G06F 11/1464* (2013.01);
(Continued)

(58) Field of Classification Search
CPC ............... G06F 21/602; G06F 21/6209; G06F 11/1448; G06F 11/1464
(Continued)

(56) References Cited

U.S. PATENT DOCUMENTS 6,330,572 B1 * 12/2001 Sitka ................. G06F 17/30082
707/608
6,578,041 B1    6/2003 Lomet
(Continued)

FOREIGN PATENT DOCUMENTS

WO    2007133791 A3    11/2007

OTHER PUBLICATIONS

Rawat, S., et al, 'A Survey of Various Techniques to Secure Cloud Storage', International Journal of Computer Science and Network Security, vol. 12 No. 3, Mar. 2012, entire document, http://paper.ijcsns.org/07_book/201203/20120318.pdf.*
(Continued)

*Primary Examiner* — Luu Pham
*Assistant Examiner* — Ronald Baum
(74) *Attorney, Agent, or Firm* — Peter J. Edwards

(57) ABSTRACT

As disclosed herein a computer system for secure database backup and recovery in a secure database network has N distributed data nodes. The computer system includes program instructions that include instructions to receive a database backup file, fragment the file using a fragment engine, and associate each fragment with one node, where the fragment is not stored on the associated node. The program instructions further include instructions to encrypt each fragment using a first encryption key, and store, randomly, encrypted fragments on the distributed data nodes. The program instructions further include instructions to retrieve the encrypted fragments, decrypt the encrypted fragments using the first encryption key, re-encrypt the
(Continued)

decrypted fragments using a different encryption key, and store, randomly, the re-encrypted fragments on the distributed data nodes. A computer program product and method corresponding to the above computer system are also disclosed herein.

6 Claims, 5 Drawing Sheets

(51) Int. Cl.
*G06F 11/14* (2006.01)
*G06F 21/62* (2013.01)
*G06C 1/00* (2006.01)

(52) U.S. Cl.
CPC .......... *G06F 21/6209* (2013.01); *G06C 1/00* (2013.01); *G06F 2201/80* (2013.01); *G06F 2201/805* (2013.01); *G06F 2221/2107* (2013.01)

(58) Field of Classification Search
USPC ........................................................ 380/279
See application file for complete search history.

(56) References Cited

U.S. PATENT DOCUMENTS

| | | | |
|---|---|---|---|
| 7,587,368 B2* | 9/2009 | Felsher | G06F 19/322 123/620 |
| 7,779,128 B2 | 8/2010 | Utard et al. | |
| 7,869,383 B2 | 1/2011 | Tabbara et al. | |
| 7,890,508 B2 | 2/2011 | Gerber et al. | |
| 8,601,498 B2 | 12/2013 | Laurich et al. | |
| 8,630,983 B2 | 1/2014 | Sengupta et al. | |
| 8,677,132 B1 | 3/2014 | Liao et al. | |
| 8,904,080 B2 | 12/2014 | Martin et al. | |
| 2003/0021417 A1* | 1/2003 | Vasic | G06F 17/30067 380/277 |
| 2005/0044162 A1* | 2/2005 | Liang | G06F 17/30067 709/212 |
| 2007/0061594 A1 | 3/2007 | Ginter et al. | |
| 2007/0100913 A1 | 5/2007 | Sumner et al. | |
| 2007/0226807 A1 | 9/2007 | Ginter et al. | |
| 2008/0072035 A1 | 3/2008 | Johnson et al. | |
| 2010/0037056 A1 | 2/2010 | Follis et al. | |
| 2010/0058054 A1 | 3/2010 | Irvine | |
| 2010/0058476 A1 | 3/2010 | Isoda | |
| 2010/0088268 A1 | 4/2010 | Buller et al. | |
| 2010/0088269 A1 | 4/2010 | Buller et al. | |
| 2010/0088389 A1 | 4/2010 | Buller et al. | |
| 2010/0205152 A1 | 8/2010 | Ansari et al. | |
| 2010/0211781 A1 | 8/2010 | Auradkar et al. | |
| 2010/0268966 A1 | 10/2010 | Leggette et al. | |
| 2010/0318812 A1* | 12/2010 | Auradkar | G06F 11/1464 713/193 |
| 2012/0166818 A1 | 6/2012 | Orsini et al. | |
| 2013/0054536 A1 | 2/2013 | Sengupta et al. | |
| 2013/0275695 A1 | 10/2013 | Ponsford et al. | |
| 2015/0052354 A1 | 2/2015 | Purohit | |
| 2015/0254150 A1* | 9/2015 | Gordon | G06F 11/1662 714/6.3 |
| 2015/0304306 A1 | 10/2015 | Ponsford et al. | |
| 2016/0132684 A1 | 5/2016 | Barbas et al. | |
| 2017/0048021 A1 | 2/2017 | Yanovsky et al. | |

OTHER PUBLICATIONS

Shah, R., et al, 'Privacy Preserving audit and extraction of digital contents', Cryptology ePrint Archive, Report 2008/186, 2008, entire document, https://pdfs.semanticscholar.org/8600/5009402ef47f23ee0d2548f73e6aabbe714e.pdf.*
Rawat et al., "A Survey of Various Techniques to Secure Cloud Storage", IJCSNS International Journal of Computer Science and Network Security, vol. 12 No. 3, Mar. 2012, pp. 116-121.
Shah et al., "Privacy-Preserving Audit and Extraction of Digital Contents", Cryptology ePrint Archive, Report 2008/186, 2008, 21 pages, entire document, https://pdfs.semanticscholar.org/8600/5009402ef47f23ee0d2548f73e6aabbe714e.pdf.
Barbas et al., "Secure Database Backup and Recovery", U.S. Appl. No. 15/497,311, filed Apr. 26, 2017.
IBM, List of IBM Patents or Patent Applications Treated as Related, Apr. 25, 2017, 2 pages.
Asmuth et al., "A Modular Approach to Key Safeguarding", IEEE Transactions on Information, vol. IT-29, No. 2, Mar. 1983, ©1983 IEEE, pp. 208-210.
Bardou et al., "Efficient Padding Oracle Attacks on Cryptographic Hardware", HAL archives-ouvertes, Submitted on Jun. 6, 2012 (v2), last revised Jan. 25, 2012 (v3), INRIA Project Prosecco, France, pp. 1-23, <https://hal.inria.fr/file/index/docid/704790/filename/RR-7944.pdf>.
Disclosed Anonymously et al., "Database backup with encrypting sensitive data", An IP.com Prior Art Database Technical Disclosure, IP.com No. 000236475, IP.com Electronic Publication: Apr. 29, 2014, pp. 1-4.
Rivest et al., "A Method for Obtaining Digital Signatures and Public-Key Cryptosystems", Laboratory for Computer Science, Massachusetts Institute of Technology, Cambridge, MA, pp. 1-15, printed on Aug. 19, 2015.
Shamir, "How to Share a Secret", Communications of the ACM, Nov. 1979, vol. 22, No. 11,©1979 ACM 0001-0782/79/1100-0612, pp. 612-613.
"Using encryption with Backup Exec", Symantec, Updated: Apr. 8, 2015, pp. 1-9, <https://support.symantec.com/en_US/article.HOWTO98926.html>.
Barbas et al, "Secure Database Backup and Recovery", U.S. Appl. No. 14/197,685, filed Nov. 6, 2014, pp. 1-32.
Patents Act 1977: Examination Report under Section 18(3), Intellectual Property Office, Application No. GB1419768.5, dated May 20, 2016, 2 pages.
Notification of Grant: Patent Serial No. GB2532039, Dated Aug. 23, 2016, 2 pages.
IBM, List of IBM Patents or Patent Applications Treated as Related, Oct. 26, 2016, 2 pages.

* cited by examiner

SECURE DATABASE BACKUP AND RECOVERY

BACKGROUND

This invention relates to database backup and recovery and more particularly to secure database backup and recovery.

Database file systems typically store large amounts of data. To ensure that the data stored in the database file system can be recovered in the event of a failure and/or corruption of data, the database file system data is typically backed up on a frequent basis. Backing up data in a database file system involves creating a copy of data that is to be backed up and stored in a separate site from the database file system disks. Typically, database file system data is copied to secondary storage (for example local drives and network drives).

SUMMARY

As disclosed herein, a computer system for secure database backup and recovery in a secure database network has N distributed data nodes. The computer system includes one or more computer processors, one or more computer readable storage media, and program instructions stored on the one or more computer readable storage media, and program instruction stored on the one or more computer readable storage media for execution by at least one of the one or more processors. The program instructions include instructions to receive a database backup file from a database system, fragment the file into a plurality of fragments using a fragment engine, and associate each fragment of the plurality of fragments with one node of the plurality of distributed data nodes, respectively, wherein the fragment is not stored on the node with which the fragment is associated. The program instructions further include instructions to encrypt each fragment of the plurality of fragments using a first encryption key, thereby providing a plurality of encrypted fragments, and store, randomly, the plurality of encrypted fragments on the plurality of distributed data nodes. The program instructions further include instructions to retrieve, after a determined duration, the plurality of encrypted fragments, decrypt the plurality of encrypted fragments using the first encryption key, thereby providing a plurality of decrypted fragments, re-encrypt the plurality of decrypted fragments using a different encryption key, thereby providing a plurality of re-encrypted fragments, and store, randomly, the plurality of re-encrypted fragments on the plurality of distributed data nodes. A computer program product and method corresponding to the above computer system are also disclosed herein.

DETAILED DESCRIPTION

File system administrators try to protect backups against unrecoverable damage to file systems and storage systems that host the data. However, current protection solutions continue to require significant investments in hands-on administration, time allocation, and storage space consumption. The most common means of providing security for a backup is to use encryption, however there is a significant risk that the backup may be compromised. While such authentication protocols reduce the risk of unauthorized access to the backup, they suffer from a number of limitations.

Further, the problem of generating and protecting database backups takes the limitation (regardless of the user authentication scheme used) that the information is centered in a single backup unit and usually kept in a single place for prolonged periods of time without proper monitoring. Therefore, there is a need for improved approaches for implementing secure database backup and recovery systems in database corporate applications.

Figure 1:
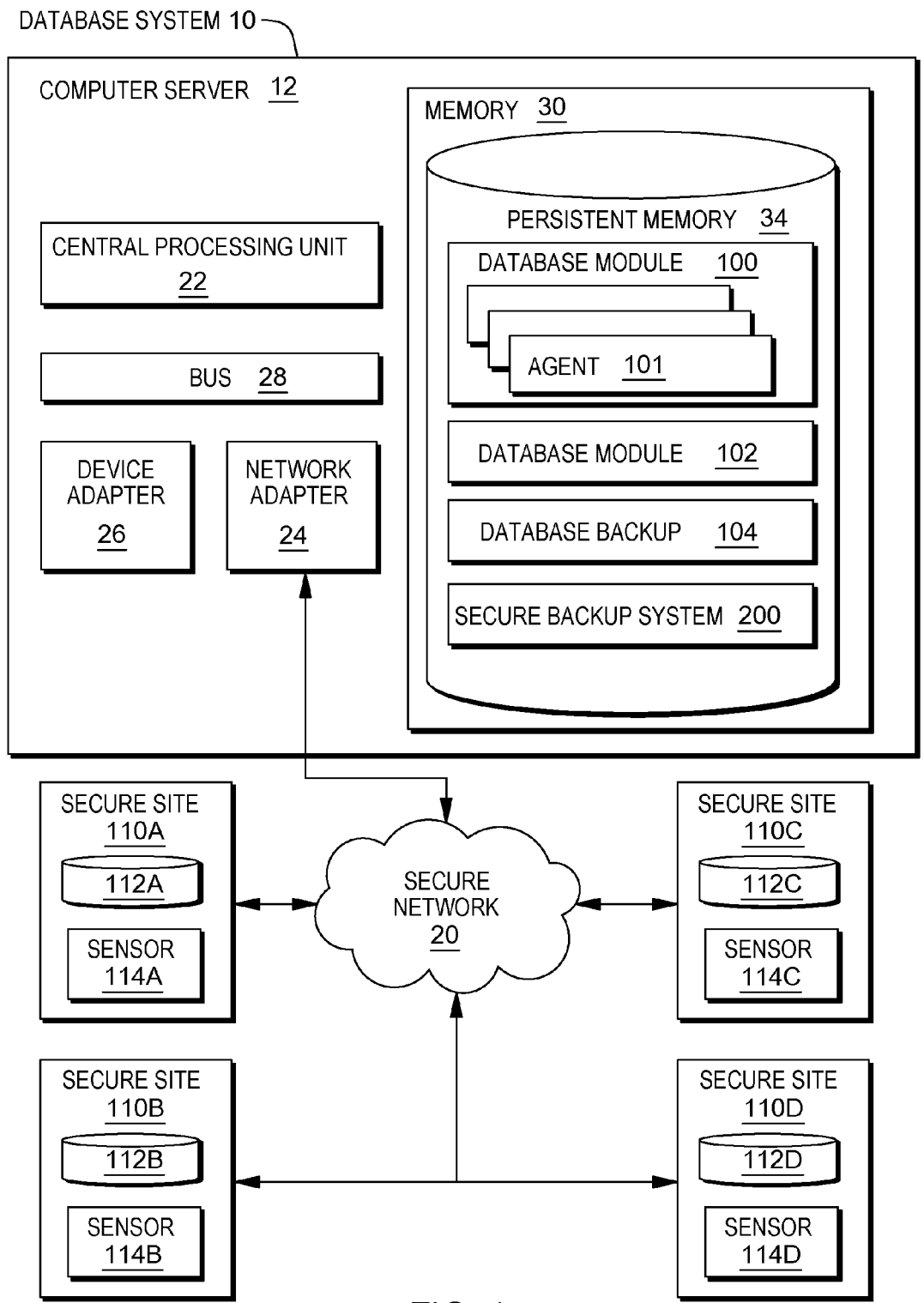
FIG. 1 is a deployment diagram, in accordance with at least one embodiment of the present invention.

Referring to FIG. 1, the deployment of one embodiment in a database system 10 is described. Database system 10 is operational with numerous other general purpose or special purpose computing system environments or configurations. Examples of well-known computing processing systems, environments, and/or configurations that may be suitable for use with database system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Database system 10 may be described in the general context of computer system-executable instructions, such as program modules, being executed by a computer processor. Generally, program modules may include routines, programs, objects, components, logic, and data structures that perform particular tasks or implement particular abstract data types. Database system 10 may be embodied in distributed cloud computing environments where tasks are performed by remote processing devices that are linked through a communications network. In a distributed cloud computing environment, program modules may be located in both local and remote computer system storage media including memory storage devices.

Database system 10 comprises: general-purpose computer server 12 and one or more input devices and output devices (not shown) directly attached to the computer server 12. Database system 10 is connected to a secure network 20. Database system 10 communicates with a user using input devices and output devices (not shown). Input devices include one or more of: a keyboard, a scanner, a mouse, trackball or another pointing device. Output devices include one or more of a display or a printer. Database system 10 communicates with secure sites 110A to 110D over network 20. Secure network 20 can be a local area network (LAN), a wide area network (WAN), or the Internet when using secure channels.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices. Device adapter 26 is connected to bus 28 and input devices and output devices for enabling communication between computer server 12 and input devices and output devices. Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory and non-volatile or persistent memory (not shown). Examples of volatile memory are random access memory (RAM) and cache memory. Generally volatile memory is used because it is faster and generally non-volatile memory is used because it will hold the data for longer. Database system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of one embodiment comprise: database module 100; agent 101; data module 102; database backup 104; and secure backup system 200. Further program modules that support the embodiment but are not shown include firmware, boot strap program, operating system, and support applications. Each of the operating system, support applications, other program modules, and program data or some combination thereof, may include an implementation of a networking environment.

Database system 10 communicates with secure sites 110A to 110D over at least one secure network 20 (such as a corporate local area network (LAN), a corporate general wide area network (WAN)) via network adapter 24. Network adapter 24 communicates with the other components of computer server 12 via bus 28. It should be understood that although not shown, other hardware and/or software components could be used in conjunction with database system 10. Examples, include, but are not limited to: microcode, device drivers, redundant processing units, external disk drive arrays, redundant array of independent disks (RAID), tape drives, and data archival storage systems.

Secure sites 110A to 110D each comprise respective databases 112A to 112D and sensors 114A to 114D. A secure site is normally a distributed system but it is enough that a secure site is isolated from other secure sites. Databases 112A to 112D are any storage system that can store a fragment of a backup database. Sensors 114A to 114D are for listening for communication requests and sending back responses including a stored fragment.

Database module 100 comprises processing logical for a prior art database system. Data module 102 is storage for the data of the database system. Database backup 104 comprises a copy of the data in serial or backup form that may be used to rebuild the database if the original data becomes corrupt.

Figure 2:
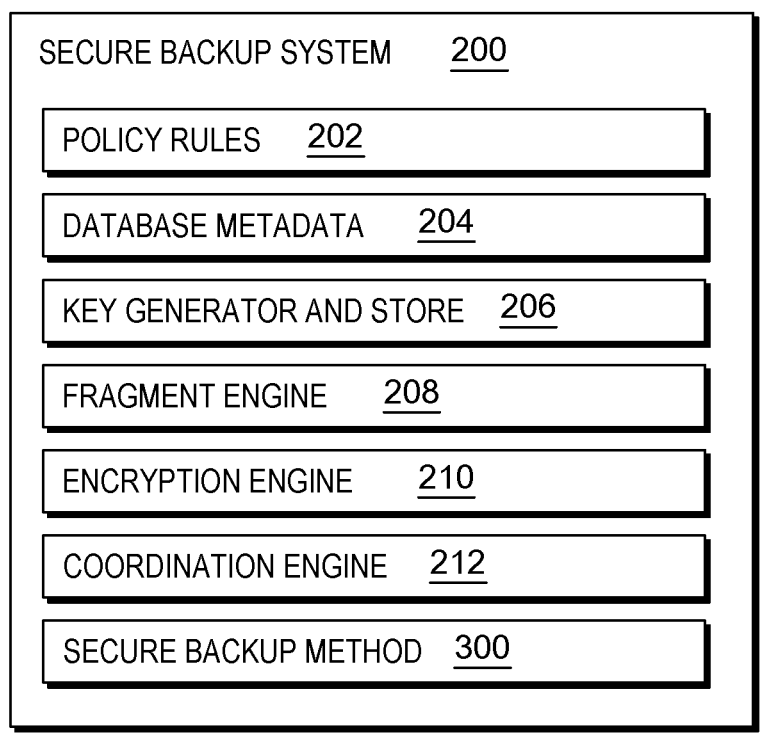
FIG. 2 is a component diagram depicting a secure backup system, in accordance with at least one embodiment of the present invention.

Secure backup system 200 comprises the main processing logic for the present embodiment. Referring to FIG. 2, secure backup system 200 comprises the following components: policy rules 202; database metadata 204; key generator and store 206; fragment engine 208; encryption engine 210; coordination engine 212; and secure backup method 300.

Policy rules 202 are for defining the rules when and how the secure backup system operates. For instance a rule could define that fragments are gathered up and redistributed every week or a rule could be defined that fragments are gathered and redistributed upon an event such as a such as creation of a new backup file.

Database metadata 204 stores metadata relating to the backup file including a map of how to rebuild the backup file from the fragments. Database metadata 204 also stores metadata for each fragment including a node name for the node (that the fragment is not sent to) and the encryption key. Database metadata 204 also stores a temporary list of node and associated node addresses that is used for distribution of fragments but not used to record which fragments are sent to which node. Key generator and store 206 is for generating the encryption keys.

Fragment engine 208 is for fragmenting a backup file into fragments and for creating a fragment index for rebuilding the backup file. The fragment index comprises instructions for assembling the fragments in the correction order. Fragment engine 208 is also for rebuilding backup file from said fragments and said fragment index.

Encryption engine 210 is for encrypting and decrypting fragments according to associated keys.

Coordination engine 212 is for associating each fragment with a distinct node that will not be used to store said fragment. The fragment node associations are stored in fragment node association table 400. Coordination engine 212 is also for coordinating the storing of the fragments on a different node to where it was retrieved from.

In some embodiments, secure backup method 300 manages the components of secure backup system 200. Preferably the coordination engine may associate each fragment with two or more nodes such that none of said two or more nodes will be used to store said fragment. In another embodiment the coordination engine may associate each fragment with two or more nodes such that only said nodes will be used to store said fragment. Thereby a node or site will never see all of the fragments within the lifetime of the backup. The embodiments prevent a patient attacker from collecting all of the database pieces by simply 'waiting' long enough on a single node. In one embodiment the number of fragments is less than or equal to the number of nodes N but other embodiments are envisioned where n could be more than N. The number of nodes N can be increased before distributing the fragments.

Some embodiments provide methods and systems for securely backing up and recovering a database file system. The embodiments take a new view of the problem for securely generating and recovering database backups in a way that recognizes that backups kept statically in a unique place and exposed for major periods of time inevitably make the backup more sensitive to unauthorized access. Certain embodiments address this problem by fragmenting a backup into a number of different encrypted pieces, sending the pieces to distinct secure sites in a secure network such as a corporate network, and where each backup piece changes position regularly and randomly in the secure network. Upon a valid user restore command, all the backup pieces are gathered, merged and presented to the user. Some embodiments focus on a method and a system where backup pieces are constantly changing nodes within the network and where the temporary site is determined by using a randomizing algorithm in a way that any motion pattern of the backup pieces are impossible to discover or to be anticipated by unauthorized users.

In some embodiments, database systems are not aware of the locations of the different backup pieces in the network. In some embodiments, storing and retrieval of fragments is performed by agents in the database system and sensors in the data nodes whereby fragment node location is not stored in the database system. In other embodiments, the fragment node location is deleted from the database after movement of fragments whereby the database system cannot be queried about the location of the sites and whereby the database system is not aware of the location of each fragment across the N sites. In such embodiments the accumulation of all the backup pieces in temporal archive images for any particular disk is prevented, for example, if there are N sites, each backup piece can only ever be allowed to be moved between N−1 sites. For example, a method of randomly distributing backup fragments such that any one node will never see all of the fragments within the lifetime of the backup. In other embodiments, after retrieving each fragment from a respective node, said fragment is stored again on a different node from the node it was retrieved from. Advantageously, said system further comprising a key generator and key store for fragmenting the key; encrypting each key fragment; and storing each encrypted key fragment with a backup fragment. More advantageously said database metadata is added to the fragment whereby database metadata is fragmented and distributed. Still more advantageously such database metadata includes, but is not limited to, network configuration, database node locations and backup image expiration. Even more advantageously said database metadata is validated during retrieval to demonstrate a secure method.

Suitably a randomizing algorithm determines the destination node of the fragment whereby it is difficult to discover any motion pattern of the fragments. More suitably said encryption is public/private key encryption.

Figure 3:
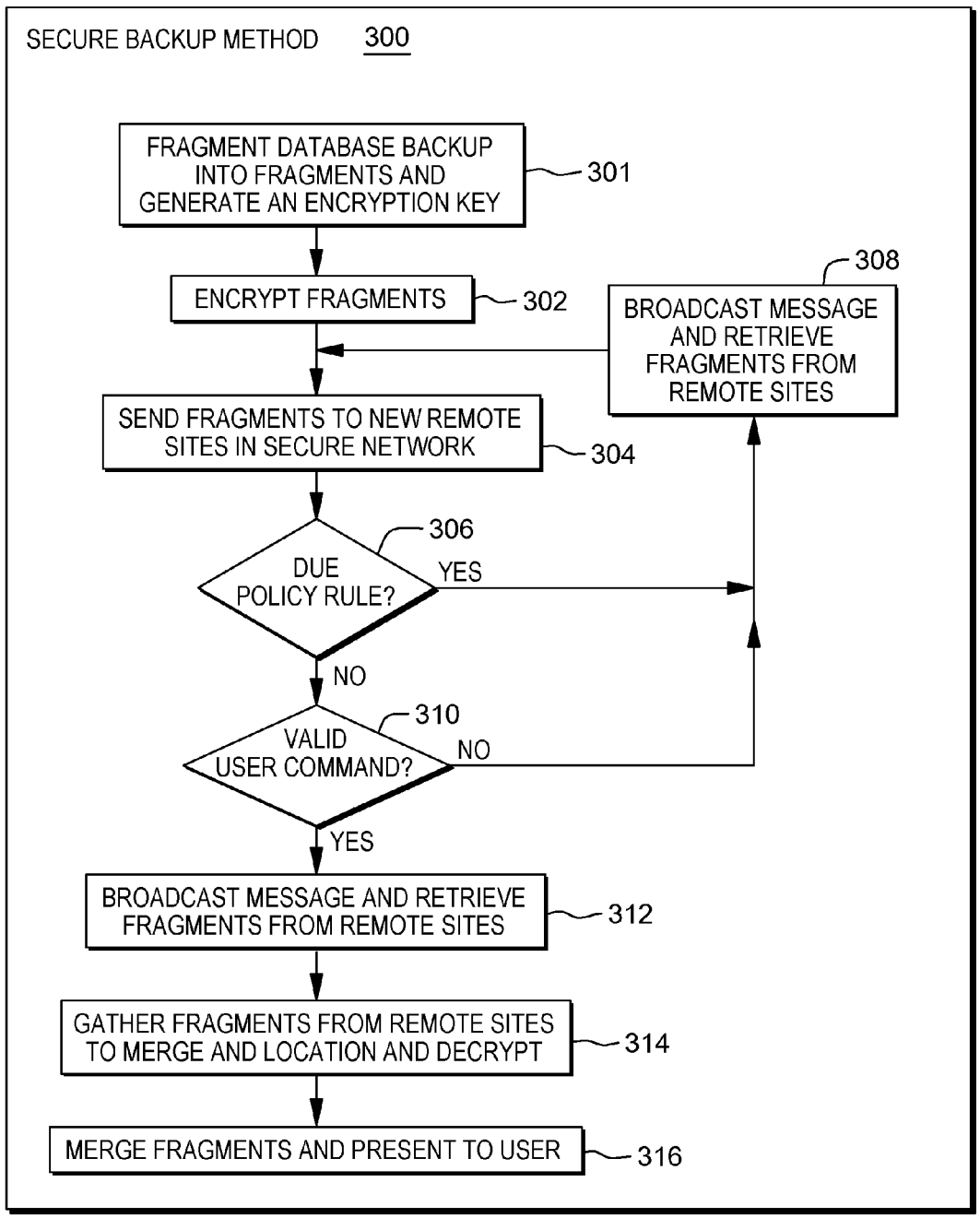
FIG. 3 is a flowchart of a secure backup method, in accordance with at least one embodiment of the present invention.

Referring to FIG. 3, secure backup method 300 comprises logical process steps 301 to 316 performed over four phases. Secure backup method 300 may be executed by the database system.

Phase 1) Fragmenting a database backup.

Step 301 is for fragmenting a database backup into fragments and creating a fragment index for reassembling the fragments. Step 301 is also for generating an encryption key. The method is initiated upon a user request command. The database data is fragmented in a random manner. This may be done using a secret sharing algorithm such as Shamir (as described in "How to share a secret", Communications of the ACM 22(11): 612-613), or Asmuth-Bloom ("A modular approach to key safeguarding", C. A. Asmuth and J. Bloom. IEEE Transactions on Information Theory, IT-29(2): 208-210, 1983), among others. Since any piece of the backup can be represented as a sequence of bits, this order of bits can be split into x pieces (where each piece has N=K/x bits), the secret sharing refers to dividing secret information into N pieces of share information such that the secret information is restored only in the case where all pieces of share information share(1), . . . , share(N) are given, secret information SE can be restored, but even if (N−1) pieces of arbitrary share information share are given, the secret information SE cannot be obtained at all.

In some embodiments, metadata is added to the encryption key of the backup, where the encryption key is fragmented and each piece encrypted and randomly distributed on the secure network, where each piece is regularly and randomly changing the position in the secure network. This will allow enhanced security between the database system and the backup image itself. Such metadata could include, but is not limited to, subnet information, geotagging of the database system location, backup image expiration. In the event that metadata is present on the encryption key of the backup image the corresponding matching data must be validated against the database system, for example, the backup image can only be restored to a specific database system in a specific subnet. Other possible usage of this metadata could be to set expiry dates for the backup images, for example, once said date is passed then the backup image cannot be restored to any database system.

Phase 2) Encrypting the backup pieces.

Step 302 is for encrypting the backup fragments. Each fragment is encrypted by using known public key encryption such as RSA encryption (based on an algorithm for private/public-key cryptography from R. L. Rivest, A. Shamir, and L. Adleman, A method for obtaining digital signatures and public-key crypto systems, Communications of the ACM 22 (11): 612-613. Step 301 is for fragmenting a database backup into fragments and creating a fragment index for reassembling the fragments. Step 301 is also for generating an encryption key. The method is initiated upon a user request command. The database data is fragmented in a random manner. This may be done using a secret sharing algorithm such as Shamir (as described in "How to share a secret", Communications of the ACM 22 (11): 612-613), or Asmuth-Bloom ("A modular approach to key safeguarding", C. A. Asmuth and J. Bloom. IEEE Transactions on Information Theory, IT-29(2):208-210, 1983), among others. Since any piece of the backup can be represented as a sequence of bits, this order of bits can be split into x pieces (where each piece has N=K/x bits), the secret sharing refers to dividing secret information into N pieces of share information such that the secret information is restored only in the case where all pieces of share information share(1), . . . , share(N) are given, secret information SE1 can be restored, but even if (N−1) pieces of arbitrary share information share are given, the secret information SE cannot be obtained at all.

While the public key can be known to everyone and is used for encrypting messages, the messages encrypted with the public key can only be decrypted using the private key. The public key consists of two integers (n; e) and the private key consists of two integers (n; d). To communicate a message, which has been agreed-upon to be an integer m with 1.1toreq.m.1toreq.n, sender uses the public key to compute the cipher c=m.sup.c mod n and transmits it to receiver. To decipher the message, receiver uses its private key to compute c.sup.d mod n, which gives exactly m.

Phase 3) Storing and managing the backup fragments on a secure network.

Step 304 is for sending backup fragments to new remote sites in the secure network. The process of managing and transporting the backup fragments can be done by the database management system and by using database agents. Database agents are engine dispatchable unit (EDU) processes or threads. Database agents do the work in the database manager that applications request. In UNIX® environments, these agents run as processes. In Intel based operating systems such as Microsoft Windows®, the agents run as threads. Unix is a registered trademark of The Open Group. Microsoft and Windows are registered trademarks of Microsoft Corporation in the US and/or other countries.

After all the fragments are encrypted, database agents are activated to move the backup pieces to distinct sites in the secure network known to be secure. The sites can be located in drives, in a single server or in different servers across the secure network. The distribution of the fragments is made using a randomizing algorithm in a way that any motion pattern of the backup pieces is practically undiscoverable by unauthorized users. The step further includes and setting an unallowable site for each fragment where the fragment is not to be stored. This acts as a security enhancement in a way that prevents three possible situations: (1) accumulation of all the backup pieces in temporal archive images for any particular disk, for example, if there are N sites, each backup piece can only ever be allowed to be moved between N−1 sites; (2) prevent a patient attacker from collecting all of the database pieces by simply 'waiting' long enough on a single node; and (3) ensure that full randomized scenario cannot be pieced together from archived disk image backups. The database system sends the fragments to destination nodes and does not retain information about which fragment is sent to which destination node. As such the database system is not aware of the final destination of the backup pieces and every time they are moved to new sites.

The database system comprises several sensors spread across the secure network that identify the activity done by the database agents at the remote sites. Each sensor comprises an adapter configured to gather detected actions of the database agents happening at the remote sites of the corporate network and packaging the same information it in a specific format for sending to the database system upon request. The sensors may be hardware or software based or a combination of both. In some embodiments, examples of sensors are third-party sensors like Snort sensors and/or Nessus sensors. Snort is an open source intrusion prevention system capable of real-time traffic analysis and packet logging, see snort.org. Nessus is a global standard in detecting and assessing network data from Tenable Network Security Inc. Nessus and Tenable are trademarks in the US and/or other countries of Tenable Network Security Inc. The threat prevention components of a sensor include a packet classifier, which decides which packets are inspected. If a packet matches any one of several predefined rules contained within the rules set, the packet is flagged and reported as a alert. Accordingly, the rule set may comprises rules amended and/or updated or expanded to include the database system specific rules. Alerts are then converted into specific format by adapters and sent to the database system upon request.

Step 306 is for checking policy rules. If a policy rule is due then step 308 else step 310. As previously mentioned, the fragments change position regularly according to a set of policy rules, such as the maximum allowed time in the same site, or the frequency of stays in a specific site, among others.

Step 308 is for broadcasting a message to the remote sites. A delay may be used according to the security requirements of the database system. In response the remote sites send back any fragments that are stored such that the fragments are retrieved from remote sites. Next the method returns to step 304. When a new change in position is required for each of the backup pieces, the database system sends a broadcast message to the corporate network for each sensor. The message requests the site of a specific backup piece. In the sensors where activity data was gathered an acknowledge receipt is generated upon the database request containing the information for a specific backup piece. The information is then converted into specific format and encapsulated in a packet that is sent back to the database system. The database system retrieves the receipt containing the information about the site where a specific backup piece is positioned from the relevant sensors and by using a pure random algorithm generates a new site position for each of the backup pieces. Database agents are then activated to move the backup pieces to new distinct sites in the corporate network, and this information is not retained by the database system. As such the database system is always unaware of the several backup pieces across the corporate network. This process is repeated every time the backup pieces change the position in the corporate network.

Phase 4) Recover and merge the database backup.

Step 310 is for checking if there is a valid user command and branching to step 312 if so. If there is no valid user command then the process branches to step 308.

Step 312 is for broadcasting a message and retrieving fragments from remote sites. When a valid user access command is received, the database system sends a broadcast message to the corporate network for each sensor. The message requests the site of each specific backup piece. In the sensors where activity data was generated for the activities of the database agents, the database request is acknowledged and a receipt with the data is then converted into specific format and encapsulated in a special transmission packet that is transmitted back to the database system.

Step 314 is for gathering fragments from remote sites to merge location and decrypt. The database agents are activated to retrieve all the fragments from each site and gather all the fragments in a merge site. Once at the merge site, the database system using a decrypting function decrypts each fragment.

Step 316 is for merging fragments and presenting to a user. A merge function joins the decrypted fragments using the fragment index into a single backup presented to the user. The merge operation is conducted by sorting each fragment from the initial backup and keeping the fragment index in the same order in which the matching backup piece was in the initial backup file system. The merge of all the pieces of share information from each backup piece is done by merging bits of the pieces of share information so that the order of the fragment index of the initial backup is kept.

The restore processes validates the metadata on the encryption key of the backup. In the event that backup piece contains any of the security metadata validation will be performed against the current database system instance. The subnet of the database system will be compared against the permitted subnet(s) on the backup piece, in the event the subnet of the current database system then the restore process will abort. Likewise, if the current system date and time has gone beyond the image expiration date the restore operation will abort. The same concept applies to geo-tagging and other possible security metadata tags that have not been explicitly stated in the disclosure.

Fragments are not stored on their respective associated node but only on nodes that are not associated with them. The embodiments focus on a method and a system where backup pieces are constantly changing nodes within the network and where the temporary site is determined by using a randomizing algorithm in a way that any motion pattern of the backup pieces is impossible to discover or to be anticipated by unauthorized users.

In such embodiments the accumulation of all the backup pieces in temporal archive images is prevented, for example, if there are N sites, each backup piece can only ever be allowed to be moved between N−1 sites (for example, a method of randomly distributing backup fragments such that any one node will never see all of the fragments within the lifetime of the backup).

Figure 4:
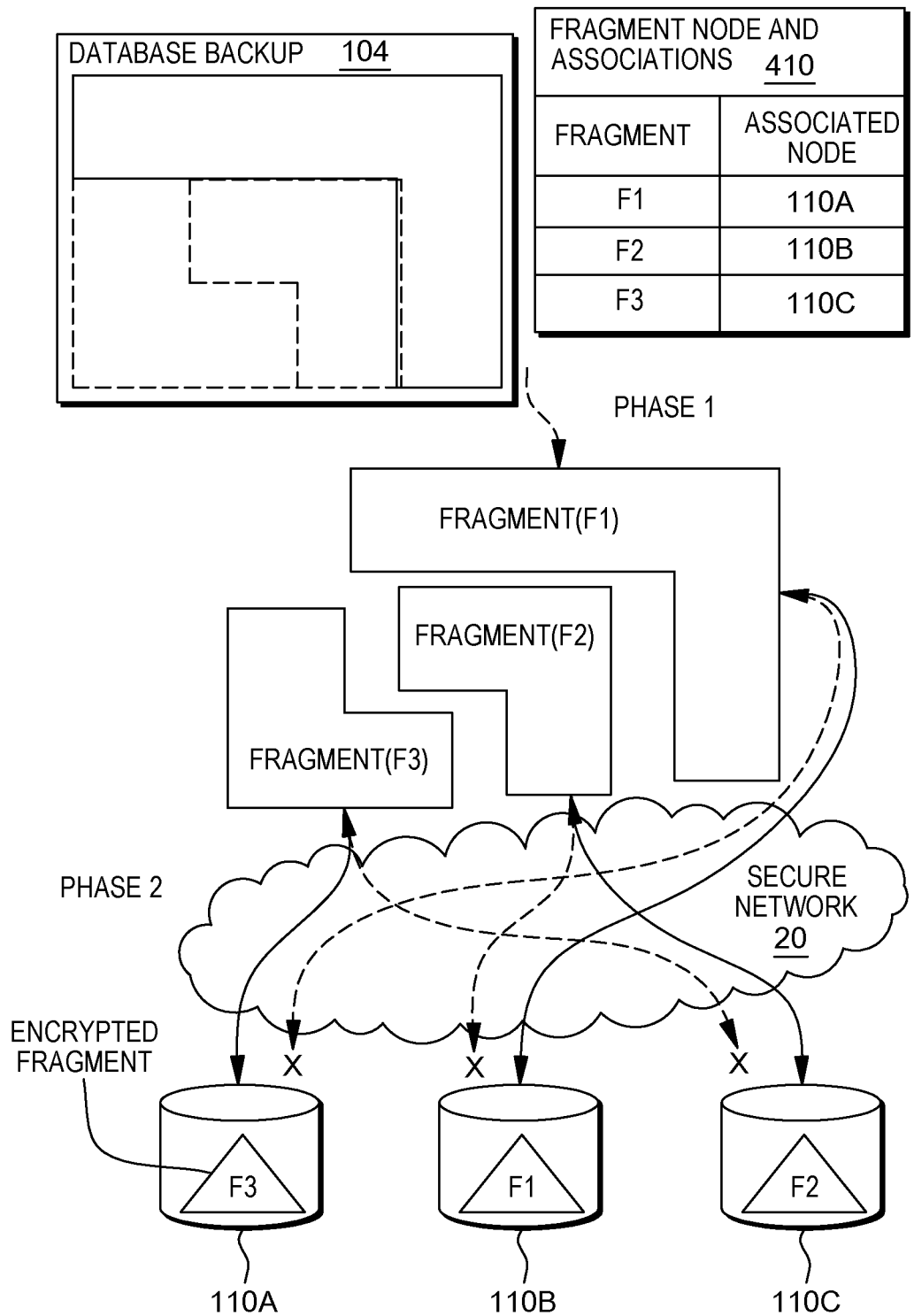
FIG. 4 is an example of database backup being fragmented and distributed, in accordance with at least one embodiment of the present invention.
Figure 5:
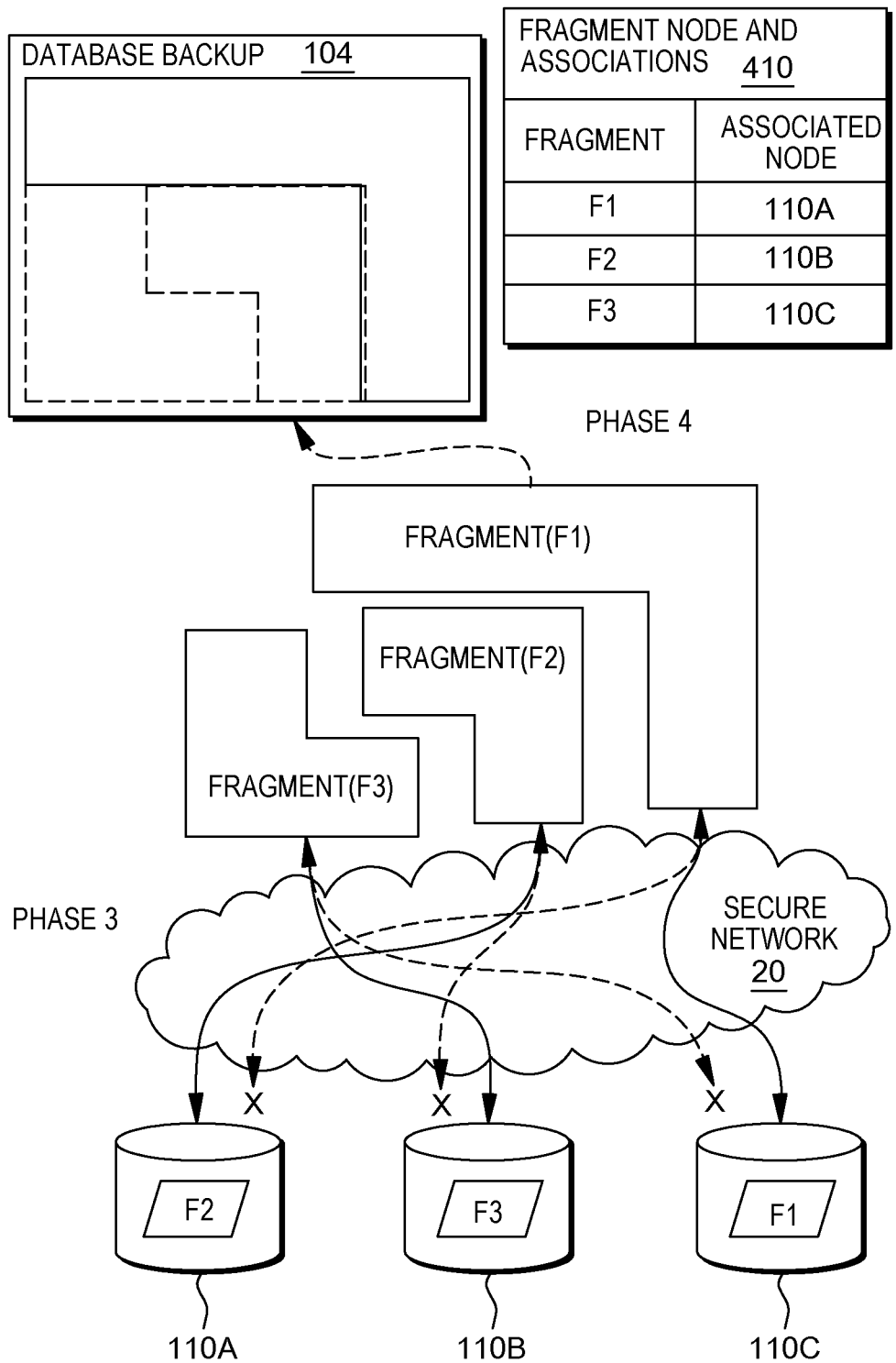
FIG. 5 is the example being decrypted, encrypted again and redistributed, in accordance with at least one embodiment of the present invention.

Referring to FIGS. 4 and 5, an example of the operation of one embodiment is described. Referring to FIG. 4, database backup 104 is above to be converted into fragments as indicated by the dash line in the interior of the database backup 104. In phase 1 the database backup 104 is broken into fragment F1, fragment F2 and fragment F3 represented by three interconnecting shapes. At the same time, fragment node associations 410 are made based on the number of fragments and available nodes. A call is made to available nodes in the secure network and eligible nodes on the secure network respond with their node address. Fragment node associations 410 are shown in table form and in this example the association is very simple: fragment F1 with node 110A; fragment F2 with node 110B; and fragment F3 with node 110C.

Phase 2 is represented by double arrows joining respective fragment to a particular node. A dashed arrow represents a fragment and its associated node where it will not be stored. Fragment F1 is stored in node 110B and not its associated node 110A. Fragment F2 is stored in node 110C and not its associated node 110B. Fragment F3 is stored in node 110A and not its associated node 110C. The fragments are encrypted using a first encryption key represented by a triangle shape. The double arrow represents the gathering back of the fragments prior to phase 3.

Referring to FIG. 5, in phase 3 the fragments have been gathered back and decrypted prior to redistribution to different nodes encrypted (re-encrypted) in a second encryption key. Therefore Fragment F1 is stored in node 110C and not its associated node 110A or previous node 110B. Fragment F2 is stored in node 110A and not its associated node 110B or previous node 110C. Fragment F3 is stored in node 110B and not its associated node 110C or previous node 110A. The fragments are encrypted used a second encryption key represented by a parallelogram shape. The double arrow represents the gathering back of the fragments prior to phase 4. In phase 4 the fragments are reassembled into database backup 104.

Additional embodiments of the invention are now described. It will be clear to one of ordinary skill in the art that all or part of the logical process steps of one embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of one embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method. It will be appreciated that the method and components of one embodiment may alternatively be embodied fully or partially in a parallel computing system comprising two or more processors for executing parallel software. A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In another aspect of the invention there is provided a computer program stored on a computer readable medium and loadable into the internal memory of a computer, comprising software code portions, when said program is run on a computer, for performing all the steps of the method claims.

In another aspect of the invention there is provided a data carrier aspect of an embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media. The embodiments operates at a machine and/or system level of a computer and below an overlying application level whereby application data is backed up and restored.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A system for secure database backup and recovery in a secure database network having N distributed data nodes, wherein N is an integer greater than 2, the system comprising:
   a processor;
   a database system backup file;
   a fragment engine for fragmenting, by the processor, the file into 3 or more fragments;
   a coordination engine for associating, by the processor, each fragment with a data node such that the data node will not be used to store the fragment;
   one or more database agents for communicating, by the processor, the fragments to the data nodes for storage and for retrieving, by the processor, the fragments a determined time later from the data nodes wherein no fragment is stored on its associated distinct data node; and an encryption engine for encrypting fragments, by the processor and using a first key, before storing and decrypting the fragments, by the processor, on retrieval using the first key wherein the fragments are further encrypted with a different key before storing again on said data nodes and wherein fragments are not stored on their associated data node but only on data nodes that are not associated with them;

wherein after retrieving each fragment from a respective data node, said fragment is stored again on a different data node from the data node it was retrieved from, and wherein determining fragment data node location is performed by a sensor in the data node:

that monitors communications traffic between data nodes and that listens for communications requests and sends back responses including stored fragments.

2. The system of claim 1 wherein storing and retrieval of fragments is performed by agents in the database system and sensors in the data nodes and wherein fragment node location is not stored in the database system.

3. The system of claim 2 further comprising a key generator and store for fragmenting the key, encrypting each key fragment, and storing each encrypted key fragment with a backup fragment.

4. The system of claim 3 wherein database metadata is added to the fragment and wherein database metadata is fragmented and distributed.

5. The system of claim 4 wherein such database metadata includes, but is not limited to, network configuration, database node locations and backup image expiration.

6. The system of claim 5 wherein the encryption is public and private key encryption.

* * * * *